(12) United States Patent
Hedditch et al.

(10) Patent No.: US 8,589,393 B2
(45) Date of Patent: Nov. 19, 2013

(54) METHODS AND APPARATUS FOR DISCOVERY OF ATTRIBUTES USING A SOCIAL MOBILE APPLICATION

(75) Inventors: John Norman Hedditch, Stanwell Park (AU); Philip John Hutton, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 143 days.

(21) Appl. No.: 13/291,487

(22) Filed: Nov. 8, 2011

(65) Prior Publication Data

US 2013/0117276 A1    May 9, 2013

(51) Int. Cl.
*G06F 17/30* (2006.01)

(52) U.S. Cl.
USPC .......................................... 707/734

(58) Field of Classification Search
USPC ................... 707/724, 733, 747, 734
See application file for complete search history.

(56) References Cited

U.S. PATENT DOCUMENTS

| | | | | |
|---|---|---|---|---|
| 6,879,994 B1* | 4/2005 | Matsliach et al. | ............ | 709/204 |
| 7,468,729 B1* | 12/2008 | Levinson | ...................... | 345/473 |
| 7,493,372 B2* | 2/2009 | Crabtree et al. | ............. | 709/217 |
| 8,073,978 B2* | 12/2011 | Sengupta et al. | ............. | 709/249 |
| 2004/0098386 A1* | 5/2004 | Thint et al. | ......................... | 707/3 |
| 2004/0198398 A1 | 10/2004 | Amir et al. | | |
| 2005/0021617 A1* | 1/2005 | Rusitschka | ................... | 709/204 |
| 2005/0038876 A1* | 2/2005 | Chaudhuri | ................... | 709/219 |
| 2005/0154911 A1* | 7/2005 | Schneider | ...................... | 713/200 |
| 2005/0193054 A1* | 9/2005 | Wilson et al. | ................. | 709/200 |
| 2005/0210102 A1* | 9/2005 | Johnson et al. | ............... | 709/204 |
| 2006/0020662 A1* | 1/2006 | Robinson | ....................... | 709/203 |
| 2006/0136498 A1* | 6/2006 | Insley | .......................... | 707/104.1 |
| 2006/0182045 A1 | 8/2006 | Anderson | | |
| 2006/0242583 A1* | 10/2006 | MacNaughton et al. | ..... | 715/733 |
| 2007/0124721 A1 | 5/2007 | Cowing et al. | | |
| 2007/0282621 A1 | 12/2007 | Altman et al. | | |
| 2008/0036653 A1 | 2/2008 | Huston | | |
| 2008/0097822 A1* | 4/2008 | Schigel et al. | .................. | 705/10 |
| 2008/0114737 A1* | 5/2008 | Neely et al. | ....................... | 707/3 |
| 2008/0214235 A1 | 9/2008 | Sagou et al. | | |
| 2010/0094536 A1 | 4/2010 | Lee et al. | | |
| 2010/0112989 A1 | 5/2010 | Andreasson | | |
| 2011/0029370 A1 | 2/2011 | Roeding et al. | | |
| 2011/0113029 A1* | 5/2011 | Kaal | ............................ | 707/723 |

OTHER PUBLICATIONS

International Search Report and Written Opinion dated May 29, 2013 for International Application No. PCT/US2012/063057, 10 pgs.

(Continued)

*Primary Examiner* — Jorge A Casanova
(74) *Attorney, Agent, or Firm* — Shumaker & Sieffert, P.A.

(57) ABSTRACT

In one general aspect, a computer-readable storage medium can be configured to store instructions that when executed cause a processor to perform a process. The instructions can include instructions to receive, at a first device, a target attribute associated with a first user account and to access a code representing the target attribute and including a plurality of values. The instructions can include instructions to send, to the second device, a portion of the code and an indicator of a relative location within the code of the portion of the code, and to receive an indicator from the second device that the portion of the code is included at the relative location within at least one code from a plurality of codes associated with a plurality of attributes associated with a second user account.

17 Claims, 9 Drawing Sheets

(56) References Cited

OTHER PUBLICATIONS

Yang et al., "E-SmallTalker: A Distributed Mobile System for Social Networking in Physical Proximity", 2010 International Conference on Distributed Computing Systems, 10 pgs.

Li et al., "FindU: Privacy-Preserving Personal Profile Matching in Mobile Social Networks", IEEE INFOCOM 2011, 9 pgs.

Terveen et al., "Social Matching: A Framework and Research Agenda", ACM Transactions on Computer-Human Interaction, vol. 12, No. 3, Sep. 2005, pp. 401-434.

* cited by examiner

METHODS AND APPARATUS FOR DISCOVERY OF ATTRIBUTES USING A SOCIAL MOBILE APPLICATION

TECHNICAL FIELD

This description relates to social network attribute discovery.

BACKGROUND

Some known computing devices are capable of detecting other nearby computing devices because they may emit short-range, wireless signals. After the nearby computing devices have been detected, communication can be established so that users of the computing devices can engage in a social interaction (e.g., a chat). Before engaging, in a social interaction, however, it may be desirable to discover whether or not the user of the nearby computing device has similar interests, etc. Known applications, however, lack the ability to privately discover selected information and/or filter out certain communications before users engage in additional social interactions.

SUMMARY

In one general aspect, a computer-readable storage medium can be configured to store instructions that when executed cause a processor to perform a process. The instructions can include instructions to receive, at a first device, a target attribute associated with a first user account and to access a code representing the target attribute and including a plurality of values. The instructions can include instructions to send, to the second device, a portion of the code and an indicator of a relative location within the code of the portion of the code, and to receive an indicator from the second device that the portion of the code is included at the relative location within at least one code from a plurality of codes associated with a plurality of attributes associated with a second user account.

In another general aspect, a method can include receiving, at a first device, a target attribute associated with a first user account, and accessing a code representing the target attribute and including a plurality of values. The method can include sending, to the second device, a portion of the code and an indicator of a relative location within the code of the portion of the code, and receiving an indicator from the second device that the portion of the code is included at the relative location within at least one code from a plurality of codes associated with a plurality of attributes associated with a second user account.

In another general aspect, a system can include a target attribute processor configured to receive, at a first device, a target attribute associated with a first user account, and configured to access a code representing the target attribute and including a plurality of values. The target attribute processor can be configured to send, to the second device, a portion of the code and an indicator of a relative location within the code of the portion of the code. The system can include a response processor configured to receive an indicator from the second device that the portion of the code is included at the relative location within at least one code from a plurality of codes associated with a plurality of attributes associated with a second user account.

In another general aspect, a computer-readable storage medium can be configured to store instructions that when executed cause a processor to perform a process. The instructions can include instructions to receive an indicator that an attribute from a plurality of attributes of a first user account has been identified as a target attribute, and to send, in response to the indicator, a set of attributes including the target attribute to a peer device. The instructions can include instruction to receive an indicator of a number of mismatches of attributes from the set of attributes with a plurality of attributes of a second user account, and calculate a probability that the target attribute is included in the plurality of attributes of the second user account based on the number of mismatches.

In another general aspect, a method can include receiving an indicator that an attribute from a plurality of attributes of a first user account has been identified as a target attribute, and sending, in response to the indicator, a set of attributes including the target attribute to a peer device. The method can include receiving an indicator of a number of mismatches of attributes from the set of attributes with a plurality of attributes of a second user account, and calculating a probability that the target attribute is included in the plurality of attributes of the second user account based on the number of mismatches.

In another general aspect, a system include a target attribute processor configured to receive an indicator that an attribute from a plurality of attributes of a first user account has been identified as a target attribute, and configured to send, in response to the indicator, a set of attributes including the target attribute to a peer device. The system can include a response processor configured to receive an indicator of a number of mismatches of attributes from the set of attributes with a plurality of attributes of a second user account, and configured to calculate a probability that the target attribute is included in the plurality of attributes of the second user account based on the number of mismatches.

In yet another general aspect, a method can include receiving an indicator that an attribute from a plurality of attributes of a first user account has been identified as a target attribute, and defining a hash value of the attribute. The method can include sending the hash value to a peer device, and receiving an indicator of a number of matches of a plurality of hash values calculated at the peer device with the hash value sent to the peer device. The method can also include calculating a probability that the attribute is included in the plurality of attributes of the second user account based on the number of matches.

In yet another general aspect, a computer-readable storage medium can be configured to store instructions that when executed cause a processor to perform a process. The instructions can include instructions to receive an indicator that an attribute from a plurality of attributes of a first user account has been identified as a target attribute, and to define a hash value of the attribute. The instructions can include instruction to send the hash value to a peer device, and receiving an indicator of a number of matches of a plurality of hash values calculated at the peer device with the hash value sent to the peer device. The instructions can include instruction to calculate a probability that the attribute is included in the plurality of attributes of the second user account based on the number of matches.

In yet another general aspect, a system can include a target attribute processor configured to receive an indicator that an attribute from a plurality of attributes of a first user account has been identified as a target attribute, and a hash module configured to define a hash value of the attribute. The target attribute processor can be configured to send the hash value to a peer device. The system can include a response processor configured to receive an indicator of a number of matches of a plurality of hash values calculated at the peer device with the hash value sent to the peer device, and configured to calculate a probability that the attribute is included in the plurality of attributes of the second user account based on the number of matches.

The details of one or more implementations are set forth in the accompanying drawings and the description below. Other features will be apparent from the description and drawings, and from the claims.

DETAILED DESCRIPTION

Figure 1:
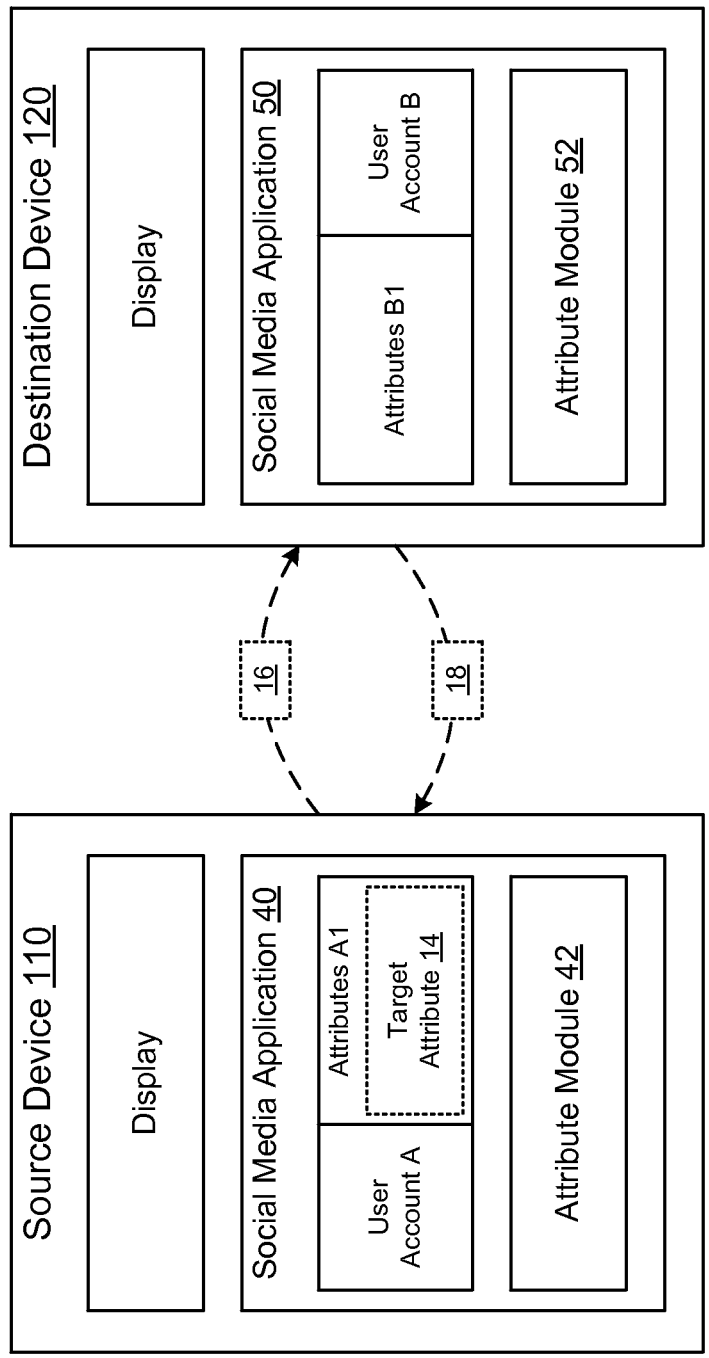
FIG. 1 is a diagram that illustrates devices configured to discover attributes.

FIG. 1 is a diagram that illustrates devices configured to discover attributes. Source device 110 is configured to send at least a portion of attributes A1 associated with user account A to destination device 120, and destination device 120 is configured to confirm whether or not the portion of the attributes A1 match (or do not match) with at least a portion of the attributes B1 associated with user account B. Specifically, the source device 110 and the destination device 120 are configured to collectively determine whether or not a target attribute 14 from the attributes A1 matches with (or has a probability of matching with) at least a portion of the attributes B1 associated with user account B. The target attribute 14 can be referred to as a target attribute because the target attribute 14 is targeted for comparison with (or discovery in) at least a portion of the attributes B1. Accordingly, any attribute that is targeted for comparison with other attributes can be referred to as a target attribute. The attributes B1 can be referred to as destination attributes because they are attributes at the destination device 120 available for comparison with the target attribute 14. In some embodiments, an indicator of a match or a mismatch can be referred to as a comparison response or as a comparison indicator.

The source device 110 is referred to as a source device because the target attribute is being sent from the source device 110 to the destination device 120. Although not shown in FIG. 1, if at least a portion of the attributes B1 are sent from the destination device 120 to the source device 110 as target attributes, the destination device 120 can function as a source device (and can be referred to as such) and the source device 110 can function as a destination device (and can be referred to as such). Although a single target attribute 14 is described in this embodiment, in some embodiments, multiple attributes from the attributes A1 can be processed as target attributes. The comparison of attributes A1, B1 (or target portions thereof) between the source device 110 and the destination device 120 is handled by the attribute modules 42, 52. A more detailed discussion of modules included in the attribute modules 42, 52 are discussed at least in connection with, for example, FIG. 2A.

The user accounts A, B can be social media accounts associated, respectively, with social media applications 40, 50. For example, the user accounts A, B, which can be associated with different users, can be social media accounts through which the user(s) can share content (e.g., images, video, comments, etc.) and/or other information with a network of users (e.g., friends, relatives, colleagues, business associates) associated with the user via the social media applications 40, 50. In some embodiments, the social media applications 40, 50 can be, or can include, social media user interfaces associated with a social media application operating at a host device (not shown) or locally at the devices (e.g., the source device 110, the destination device 120).

The exchange of attributes as described herein can be performed so that users can maintain privacy (e.g., reveal relatively little personal information) while still being able to discover (e.g., confirm), for example, mutual interests (in the form of the attributes A, B) before engaging in further social interactions. The mutual interests targeted for comparison can be represented within one or more target attributes. After mutual interests have been confirmed (e.g., confirmed with a threshold probability), the users can optionally engage in further social interactions.

The comparison of at least a portion of the attributes A1, B1 can be performed so that a user of the source device 110 may receive confirmation (e.g., confirmation with a threshold probability) as to whether or not the target attribute 14 from the attributes A1 matches (or does not match) with one or more of the attributes B1, which can be referred to as destination attributes, without explicitly revealing (e.g., masking, hiding, disguising, concealing) the target attribute 14. The target attribute 14 can be an attribute such as a social interest (e.g., an identifier of a social group, a musical interest, a social preference), a personal attribute (e.g., an indicator of gender, an indicator of age), and/or so forth of the user of user account A, that the user of user account A may desire to confirm with the user of user account B before engaging in a social interaction (e.g., chat, meeting, telephone conversation) with the user of user account B. In other words, a user of the source device 110 may trigger sending of the target attribute 14, within an attribute request 16 (also can be referred to as an attribute discovery request), to the destination device 120 to discover whether or not the target attribute 14 matches with one or more of the attributes B1 of user account B before engaging in a social interaction with the user of user account B. The confirmation, which can be included in an attribute response 18 (also can be referred to as a match response), can be defined by (e.g., triggered by a user of the destination device 120 to be defined by) the destination device 120 so that the attributes B1 may not be explicitly revealed to the user of the source device 110. After mutually confirming (e.g., confirming beyond a threshold probability) that the target attribute 14 is common to the attributes A1 and the attributes B1, the target attribute 14 can optionally be explicitly revealed.

Also, the comparison of at least a portion of the attributes A1, B1 can be performed so that identities associated with the user accounts A, B may not be explicitly revealed. In other words, users associated with the user account A, B can remain anonymous during the comparison of the attributes A1, B1 (or targeted portions thereof). After at least a portion of the attributes A1, B1 have been compared, identities associated with the user accounts A, B can be optionally revealed. In some embodiments, identities associated with the user accounts A, B can be optionally revealed during the comparison of at least some of the attributes A1, B1.

As a specific example, a user of user account A may select the target attribute 14 (from attributes A1) to be sent from the source device 110 to the destination device 120 within the attribute request 16 (also can be referred to as an attribute confirmation request or attribute discovery request) so that a user of user account B may confirm whether or not the target attribute 14 matches with (or substantially match with) at least a portion of attributes B1. The processing of the attributes A1, B1 may be performed at the source device 110 and the destination device 120, respectively, via the attribute module 42 of the social media application 40 and the attribute module 52 of the social media application 50. The target attribute 14 can be an attribute such as a social interest (e.g., an identifier of a social group, a musical interest, a social preference), a personal attribute (e.g., an indicator of gender, an indicator of age), and/or so forth of the user of user account A, that the user of user account A may desire to confirm with the user of user account B before engaging in a social interaction (e.g., chat, meeting, telephone conversation) with the user of user account B. The target attribute 14 can be sent from the source device 110 to the destination device 120 so that the target attribute 14 is concealed and without revealing the identity of the user of user account A at least until confirmation of the target attribute 14 (or a portion thereof) has occurred. In other words, the attribute request 16 can be defined at the source device 110 so that the target attribute 14, which can be included in the attribute request 16, can be concealed (e.g., masked, not revealed). In some embodiment, the target attribute 14 can be sent with multiple other attributes (that are not target attributes and can be referred to as dummy attributes) so that a user of the destination device 120 will not be able to detect (e.g., discern) which of the attributes is the attribute targeted by the source device 110 for confirmation (e.g., for discovery). Accordingly, the target attribute 14 may not be revealed as the target attribute.

In response to the attribute request 16, the destination device 120 can define the attribute response 18 based on a comparison of the target attribute 14 with the attributes B1. The attribute response can be sent from the destination device 120 to the source device 110. In some embodiment, the attribute response 18 can include an indicator of mismatches, rather than matches. The number of mismatches (or number of matches) can be an indicator of, or can be used to calculate a probability of the target attribute 14 matching with one or more of the attributes B1 will be sent to the source device 110. Accordingly, the attribute response 18 can be defined so that the user of the source device 110 will not be able to definitively identify (e.g., detect, discern) which of the attributes B1 are associated with user account B at the destination device 120. In other words, the attribute response 18 can be defined by (e.g., triggered by a user of the destination device 120 to be defined by) the destination device 120 so that the attributes B1 may not be explicitly revealed to the user of the source device 110 in the attribute response 18.

If the target attribute 14 from the attributes A1 has been matched (e.g., matched with a threshold probability) with at least a portion of the attributes B1 (and has been communicated from the destination device 120 to the source device 110 in the attribute response 18), the user of user account A may optionally engage in a social interaction with the user of user account B. For example, in response to the target attribute 14 matching (e.g., matched with at least a threshold probability) with at least a portion of the attributes B1, the user of the user account A may request via the social media application 40 a chat with the user of user account B via the social media application 50. In response to the request, the user of user account B may grant the request and engage in the chat with the user of user account A. In some embodiments, the user of user account A and/or the user of user account B may optionally reveal their respective identities before attributes are compared, while attributes are compared, and/or after attributes have been compared (e.g., during a social interaction).

Although not shown, in some embodiments, the user of user account B may send, in a concealed (e.g., a masked) fashion within an attribute request, at least a portion of the attributes B1 as target attributes from the destination device 120 to the source device 110. In other words, the user of user account B can request confirmation of a match (or mismatch) (via an attribute request) of at least a portion of the attributes B1 with at least a portion of the attributes A1 associated with the user of user account A. In such embodiments, the destination device 120 may function as a source device, and the source device 110 may function as a destination device.

In some embodiments, the source device 110 and/or the destination device 120 can be, for example, a wired device and/or a wireless device (e.g., wi-fi enabled device) and can be, for example, a computing entity (e.g., a personal computing device), a server device (e.g., a web server), a mobile phone, a personal digital assistant (PDA), e-reader, and/or so forth. The source device 110 and/or the destination device 120 can be configured to operate based on one or more platforms (e.g., one or more similar or different platforms) that can include one or more types of hardware, software, firmware, operating systems, runtime libraries, and/or so forth.

Figure 2A:
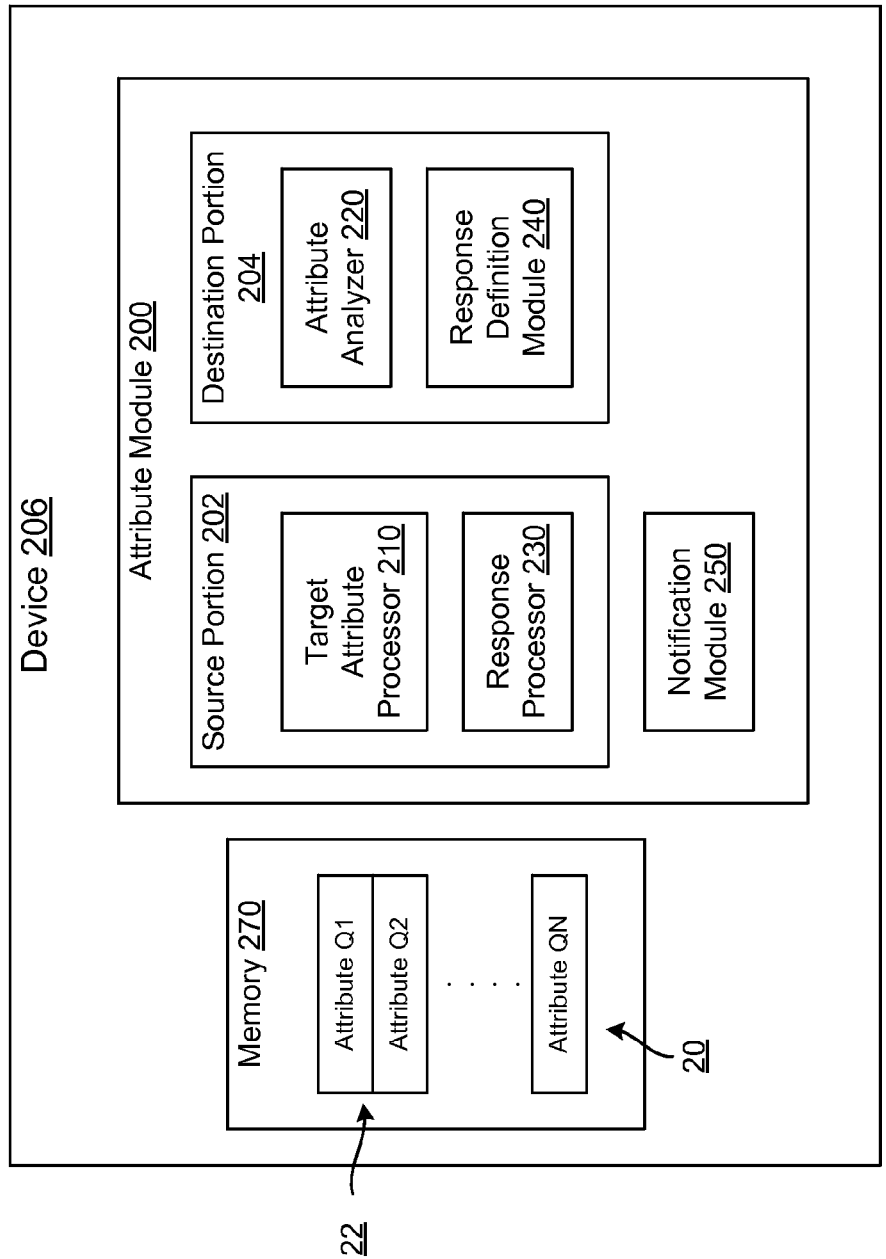
FIG. 2A is a diagram that illustrates an attribute module, according to an embodiment.

FIG. 2A is a diagram that illustrates an attribute module 200, according to an embodiment. As shown in FIG. 2A, the attribute module 200 includes a source portion 202 and a destination portion 204. The source portion 202 includes modules configured to operate when a device 206 including the attribute module 200 functions as a source device, and the destination portion 204 includes a module configured to operate when the device 206 functions as a destination device. Although not shown in FIG. 2A, the attribute module 200 can be associated with a social media application.

The attribute module 200 is configured to process attributes 20 stored in a memory 270 of the device 206. In some embodiments, the attributes 20 can be associated with a user account (e.g., a social media account) (not shown) of a user. In some embodiments, the attributes 20 can be retrieved from a user account associated with a social media application and stored in the memory 270, where the attributes 20 can be processed by the attribute module 200. In some embodiments, the attributes 20 can be accessed from (e.g., called from, retrieved from) a memory (e.g., a remote memory) that is not included in the device 206. In some embodiments, the attributes 20, when the device 206 is functioning as a source device, can be referred to as source attributes. In some embodiments, the attributes 20, when the device 206 is functioning as a destination device, can be referred to as destination attributes.

As shown in FIG. 2A, the source portion 202 of the attribute module 200 includes a target attribute processor 210 configured to define an attribute request. When the device 206 is functioning as a source device, the target attribute processor 210 is configured to send an attribute request including one or more of the attributes 20 identified as target attributes from the device 206 (functioning as a source device) to a destination device (not shown) during comparison of attributes between the device 206 and the destination device. In this embodiment, attributes Q1 and Q2 are identified as target attributes 22. In some embodiments, the target attributes 22 can be sent to the destination device in one or more packets (e.g., data packets) defining an attribute request. In some embodiments, the target attribute processor 210 can be configured to define the attribute request so that one or more of the target attributes 22 may be concealed from the destination device.

The source portion 202 of the attribute module 200 also includes a response processor 230 configured to process an attribute response. When the device 206 is functioning as a source device, the response processor 230 is configured to process an attribute response from a destination device (not shown) that indicates (in a comparison indicator) whether or not one or more of the target attributes sent from the device 206 to the destination device match or do not match with the target attributes 22.

The attribute analyzer 220 of the destination portion 204 of the stream module 200 is configured to process an attribute request. When the device 206 is functioning as a destination device, the attribute analyzer 220 is configured to receive an attribute request that includes, for example, attributes that may be target attributes or dummy attributes sent from a source device (not shown). The attribute analyzer 220 can be configured to compare the target attributes received within the attribute request with the attributes 20 accessible at (e.g., stored at, retrievable at) the device 206. The attribute analyzer 220 can be configured to determine whether or not any of the attributes received within the attribute request from the source device match (or do not match) with attributes accessible at the device 206.

A response definition module 240 of the destination portion 204 can be configured to define and send an attribute response to a source device (not shown) after an attribute request has been processed at the device 206. The attribute response can include one or more indicators (e.g., comparison indicators) of matches (or mismatches) between attributes received from a source device (not shown) and attributes accessible at the device 206 while the device 206 is functioning as a destination device.

Figure 2B:
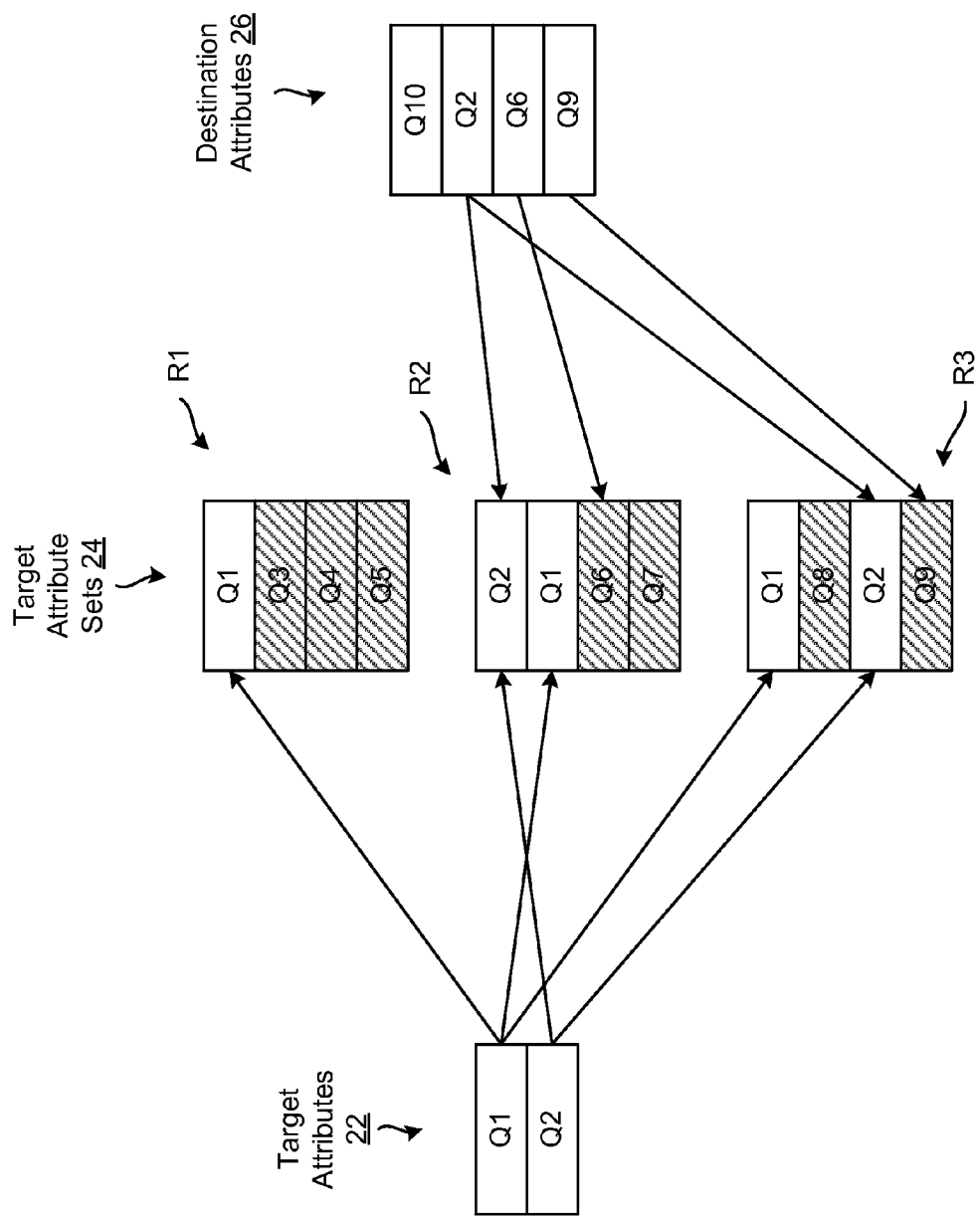
FIG. 2B is an example of target attribute concealment, according to an embodiment.

As described above, the target attribute processor 210 is configured to perform processing to conceal (e.g., mask) the attributes from the attributes 20 that are identified as target attributes in an attribute request. A specific example of target attribute concealment is described in connection with FIG. 2B. As shown in FIG. 2B, the target attributes 22 can be included by the target attribute processor 210 of the device 206 in multiple target attributes sets 24, which are labeled R1 through R3, that include a combination of the target attributes 22 and dummy attributes (shaded with lines). For example, target attribute set R1 includes target attribute Q1, and dummy attributes Q3 through Q5. Target attribute set R2 includes target attributes Q1 and Q2, and dummy attributes Q6 and Q7. Target attribute set R3 includes target attributes Q1 and Q2, and dummy attributes Q8 and Q9.

The target attributes sets 24 can be sent to a destination device (not shown). Destination attributes 26 of the destination device can be compared by the destination device (e.g., an attribute analyzer of the destination device) with each attribute from each of the target attributes sets 24. In this embodiment, the destination device can be configured to determine that none of the destination attributes 26 match with the attributes included in the target attribute set R1. The destination device can be configured to determine that attributes Q2 and Q6 from the destination attributes 26 match, respectively, with attributes Q2 and Q6 included in the target attribute set R2. Also, the destination device can be configured to determine that attributes Q2 and Q9 from the destination attributes 26 match, respectively, with attributes Q2 and Q9 included in the target attribute set R3.

In response to the comparisons performed at the destination device, the destination device can be configured to define (e.g., define using a response definition module of the destination device) an attribute response. The attribute response can include indicators (e.g., comparison indicators) of one or more attribute matches with the attributes from the target attributes sets 24. For example, the attribute response can indicate that the destination attributes 26 do not include any matches with the attributes included in target attribute set R1, includes two matches with the attributes included in target attribute set R2, and includes two matches with the attributes included in target attribute set R3.

The attribute response (or attribute responses) defined at the destination device can be sent from the destination device and received at the response processor 230 of the device 206. Based on the number of matches included in the attribute response (or attribute responses), the response processor 230 of the device 206 can be configured to determine (e.g., determine with a specified probability) that the destination attributes 26 of the destination device do not include matches with both of the target attributes 22. Specifically, because the target attribute set R1 included the target attribute Q1 and the destination attributes 26 did not include a match with any of the attributes included in target attribute set R1, the response processor 230 can be configured to determine that the destination attributes 26 do not include attribute Q1.

In this embodiment, the attribute response included indicators of one or more attribute matches with the attributes from the target attributes sets 24. In some embodiments, the attribute response can include one or more indicators of (e.g., a quantity of) mismatches with the target attributes sets 24. For example, the destination device can define an attribute response that indicates that the destination attributes 26 do not match with two attributes included in target attribute set R2. By indicating mismatches, rather than matches, the attributes included within the destination attributes 26 can be concealed in a desirable fashion from the device 206 in some scenarios.

In some embodiments, the matches (or mismatches) that have been identified within an attribute response (or attribute responses) can be used to calculate a probability (e.g., a probability value) that the target attributes 22 are included in the destination attributes 26. In some embodiments, the probability can be calculated based on a relative size of the target attributes sets 24, the number of target attributes included in each of the target attributes sets 24, the number of target attributes sets included in the target attribute sets 24, and/or so forth. As a specific example, two mismatches and two matches exist within the target attribute set R3. Accordingly, there is approximately a 50% probability that Q1 or Q2 is included in the destination attributes 26. Generally, if a single target attribute is included in a relatively large target attribute set and a number of mismatches with the target attribute set is relatively high, a probability that the single target attribute is included in a set of destination attributes can be relatively low (e.g., a relatively low probability percentage, a relatively low probability value). Also, if a single target attribute is included in a relatively small target attribute set and the number of mismatches with the target attribute set is relatively low, a probability that the single target attribute is included in a set of destination attributes can be relatively high (e.g., a relatively high probability percentage, a relatively high probability value).

In some embodiments, comparisons of attributes (to identify matching attributes) can be performed using, for example, natural language processing techniques. For example, an attribute can be compared with another attribute based on the language used to define each of the attributes using natural language processing of each of the attributes. As a specific example, a description of a user as being "interested in sports" in an attribute can be positively matched with a description of another user as being "a sports fanatic" in another attribute. In some embodiments, attributes can be associated with identifiers (e.g., an alphanumeric identifier, unique identifiers, predefined identifiers) that can be used to identify matching attributes.

In some embodiments, the target attributes sets 24 can be sent from the device 206 (which is functioning as a source device) to a destination device (e.g., a destination device configured to access the destination attributes 26) serially and/or in parallel. For example, more than one of the target attributes sets 24 can be sent in an attribute request from the device 206 to a destination device. As another example, the device 206 can be configured to send target attribute set R1 to the destination device before sending target attribute set R2. In such embodiments, the device 206 can be configured to send the target attribute set R2 only after an attribute response related to target attribute set R1 has been received. If in the embodiment described in connection with FIG. 2B Q1 were the only target attribute 22, since none of the destination attributes 26 are matched with any of the attributes included in target attribute set R1, further communication with the destination device can be terminated without sending additional target attributes sets 24.

Although not shown in FIG. 2B, in some embodiments, a destination device can be configured to function as a source device. For example, a first device functioning as a destination device can be configured to receive one or more target attribute sets from a second device functioning as a source device. The first device can also be configured to function as a source device by defining and sending one or more target attributes sets to the second device, which will function as a destination device with respect to the target attributes set(s).

In this embodiment, each of the target attributes sets 24 includes exactly four attributes. In some embodiments, a target attribute set can include more than four attributes or less than four attributes. Also, in this embodiment, each of the target attributes sets 24 includes the same quantity (e.g., number) of attributes. In some embodiments, each of the target attribute sets from the target attributes sets 24 may not include the same quantity (e.g., number) of attributes.

In some embodiments, the target attributes 22 can be designated by a user as target attributes. For example, a user of a user account associated with the attributes 20 can select the attributes Q1 and Q2 as the target attributes 22. In some embodiments, a user can be prompted to select one or more target attributes by a notification module 250 of the attribute module 200. For example, in response to the device 206 detecting a peer device with which the device 206 can exchange attributes (for discovery of mutual attributes), the notification module 250 can notify (via one or more user interface prompts) the user. In some embodiments, the user can also be prompted (via one or more user interface prompt) to select one or more target attributes for confirmation with the peer device. In some embodiments, the target attributes can be designated by a user as target attributes before detecting the peer device with which the device 206 can exchange attributes for discovery of mutual attributes.

In some embodiments, the dummy attributes included in the target attributes sets 24 can be designated as dummy attributes by a user, randomly selected (e.g., randomly selected by the target attribute processor 210 when defining an attribute request), and/or so forth. In some embodiments, the dummy attributes can be selected from the attributes 20 associated with a user account of a user, or from a pool of attributes that may or may not intersect with the attributes 20.

Although not shown in FIG. 2B, in some embodiments, one or more target attributes sets may not include one or more target attributes. For example, a source device can be configured to define a target attribute set that includes only dummy attributes (or attributes that are not of interest to the user).

In some implementations, the attribute module 200 can be configured to operate at a host device. In such implementations, the attribute module 200 can be accessed through a network by the device 206, which can function as a client to the attribute module 200. Accordingly, the functionality of the attribute module 200 can be called and/or executed on an on-demand basis. In some implementations, the attribute module 200 can function as a background application operating in conjunction with the device 206 (and/or additional devices). In some implementations, the attribute module 200 can function as an application (or service) that can be accessed via an application programming interface (API). More details related to the attribute module 200 operating at a host device are set forth, for example, in connection with FIG. 3.

The attribute module 200 can be, or can include, any type of hardware and/or software configured to process attributes. In some implementations, one or more portions of the components shown in the attribute module 200 in FIG. 2A can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the attribute module 200 can be, or can include, a software module configured for execution by at least one processor (not shown). In some implementations, the functionality of the components can be included in different modules and/or different components than those shown in FIG. 2A. For example, although not shown, the functionality of the target attribute processor 210 of the attribute module 200 can be included in a different module than the target attribute processor 210 of the attribute module 200, or divided into several different modules.

Although not shown, in some implementations, the attribute module 200 (or portions thereof) and/or the device 206 (or portions thereof) can be configured to operate within, for example, a data center (e.g., a cloud computing environment), a computer system, one or more server/host devices, and/or so forth. In some implementations, the attribute module 200 (or portions thereof) and/or the device 206 (or portions thereof) can be configured to operate within a network. Thus, the attribute module 200 (or portions thereof) and/or the device 206 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

As discussed above, in some implementations, the attribute module 200 can be included in, or can be associated with, a social media application (not shown). The social media application can be any type of application (e.g., a smartphone application, a stand-alone application) that can be used by a user to share content and/or other information with a network of users (e.g., friends, relatives, colleagues, business associates) associated with the user. In some implementations, the social media application can be a web-based application that can be accessed by users. In some implementations, the social media application can be referred to as a social media system and can be part of a social media platform. In some implementations, the social media application can be associated with a social network service. In some implementations, the social media application can be a collaborative environment through which one or more users (such as a sharer and/or a consumer of content) can engage in collaborative work. In some implementations, the social media application can include one or more search engines, social network services, forums, instant messaging/chat applications, virtual environments, peer-to-peer communications applications, and/or so forth. In some implementations, the social media application can include, or can be based on, one or more open application programming interfaces (APIs).

The attribute module 200 (or any other portion of the device 206) can be configured to operate based on one or more platforms (e.g., one or more similar or different platforms) that can include one or more types of hardware, software, firmware, operating systems, runtime libraries, and/or so forth. In some implementations, the device 206 can represent a cluster of devices (e.g., a server farm). In such an implementation, the functionality and processing of the attribute module 200 can be distributed to several devices of the cluster of devices.

Although not shown, in some implementations, the memory 270 can be implemented as more than one memory component (e.g., more than one random-access memory (RAM) component or disk drive memory) associated with the attribute module 200. In some implementations, the memory 270 can be a database memory. In some implementations, the memory 270 can be, or can include, a non-local memory. For example, the memory 270 can be, or can include, a memory shared by multiple devices (not shown). In some implementations, the memory 270 can be associated with a server device (not shown) within a network and configured to serve the attribute module 200.

Referring back to FIG. 1, in some embodiments, the user of user account A may proceed with engaging in a social interaction with the user of user account B even if the target attribute 14 is not definitively confirmed as matching with at least some of the attributes B1. For example, the target attribute 14 (or a portion thereof) may be confirmed as matching with at least some of the attributes B1 with a specified probability (that may be less than 100%). In such instances, the user of user account A may proceed with engaging in a social interaction with the user the user account B based on (or in response to) the specified probability.

In some embodiments, a communication between the source device 110 and the destination device 120 can be performed via a secure connection. In some embodiments, the secure connection can be, for example, an encrypted connection. In some embodiments, the secure connection can be established using any combination of public and private keys. In some embodiments, the secure connection can be established using a symmetric key algorithm, an asymmetric key algorithm, and/or so forth. In some embodiments, the secure connection can be classified as a private connection.

In some embodiments, a connection between the source device 110 and the destination device 120 can be a temporary connection established for the purpose of matching one or more of the attributes A1, B1. In other words, a connection between the source device 110 and the destination device 120 can be temporarily established so that the source device 110 can send the target attribute 14 to the destination device 120 for comparison (or discovery) with one or more of the attributes B1, which are accessible at the destination device 120. If the target attribute 14 does not match with one or more of the attributes B1, the temporary connection can be terminated. If the target attribute 14 does match with one or more of the attributes B1, the connection can be maintained between the source device 110 and the destination device 124 a social interaction. In some embodiments, a different connection can be established (and the temporary connection can be terminated) between the source device 110 and the destination device 120 after confirmation that the target attribute 14 matches with one or more of the attributes B1.

Although not shown in FIG. 1, in some embodiments, the source device 110 can be configured to send, in a concealed fashion, the target attribute 14 for comparison with at least some attributes with multiple destination devices (in addition to destination device 120). For example, the source device 110 can be configured to send (via one or more secure connections) the target attribute 14 to multiple destination devices. In some embodiments, the target attribute 14 can be sent to at least a portion of the multiple destination devices serially, or in parallel. Each of the multiple destination devices can be configured to determine whether or not at least a portion of the attributes available at each of the destination devices matches with the target attribute 14. In response to matching the available attributes with the target attribute 14, a user of the source device 110 can engage in one or more social interactions with one or more users of the one or more destination devices.

In some embodiments, a temporary identifier can be sent from the source device 110 to the destination device 120 with the target attribute 14 so that an identity associated with the user account A may not be revealed. Accordingly, the temporary identifier can be associated with the user account A for comparison of at least some of the attributes A1, B1. In some embodiments, different temporary identifiers can be sent to each destination device from multiple destination devices in communication with the source device 110. In some embodiments, an identifier received from the destination device 120 at the source device 110 can be a temporary identifier (e.g., a temporary identifier associated with user account B).

In some embodiments, one or more temporary identifiers can be associated with a key (e.g., an encryption key) used for establishing a secure connection between the source device 110 and the destination device 120. For example, the source device 110 can be configured to generate a key that can be used to establish a secure connection between the source device 110 and the destination device 120. In some embodiments, the key can function as, or can be included in, an identifier of the source device 110. In some embodiments, an identifier can be included in a key used to establish a secure connection between the source device 110 and the destination device 120.

Although not shown in FIG. 1, in some embodiments, the source device 110 can be configured to send at least a portion of the target attribute 14 to one or more destination devices based on the proximity (e.g., a threshold proximity) of the one or more destination devices with the source device 110. For example, the source device 110 can be configured to send the target attribute 14 to the destination device 120 in response to an indicator that a distance between the destination device 120 and the source device 110 is within a threshold distance.

In some embodiments, the distance between the destination device 120 and the source device 110 can be determined based on, for example, global positioning system (GPS) coordinates, wireless signals exchanged between the source device 110 and the destination device, and so forth.

In some embodiments, the target attribute 14 can be automatically sent from the source device 110 and the destination device 120 for comparison in response to detecting that the destination device 120 is within a threshold distance of the source device 110. For example, the source device 110 can be configured to send out a relatively short range wireless beacon (or ping) signal. When the destination device 120 receives the beacon signal, the destination device 120 can respond to the source device 110 within indicator that the destination device 120 has received the beacon signal. In response to the response from the destination device 120, the source device 110 can be configured to send the target attribute 14 to the destination device 120 for comparison with one or more of the attributes B1, which are accessible at the destination device 120. In some embodiments, the sending of the target attribute 14 can be handled by the attribute module 42 of the social media application 40, and the comparison of the attribute(s) B1 can be handled by the attribute module 52 of the social media application 50. In some embodiments, permission can be requested (e.g., requested by a notification module such as the notification module 250 shown in FIG. 2A) before sending one or more of the target attributes 14.

In some embodiments, the target attribute 14 can be sent from the source device 110 and the destination device 120 for comparison in response to an action performed by a user of the source device 110 or a user of the destination device 120. For example, the source device 110 can be configured to determine that the destination device 120 is within a threshold distance of the source device 110. Accordingly, a user (e.g., a user associated with user account A) of the source device 110 can be notified that the destination device 120 is within the threshold distance of the source device 110. In response to the notification, the source device 110 can be configured so that the user can trigger sending of the target attribute 14 to the destination device 120 for comparison with one or more of the attributes B1, which are accessible at the destination device 120. In some embodiments, the sending of the target attribute 14 can be handled by the attribute module 42 of the social media application 40, and the comparison of the attribute(s) B1 can be handled by the attribute module 52 of the social media application 50.

As shown in FIG. 1, the exchange of attributes to discover mutual interests is a peer-to-peer exchange. In other words, the exchange of attributes is performed without, for example, processing of the attributes at a host device. Although, this does not preclude the possibility that the exchange of attributes may occur via a network that can include one or more host devices. In some embodiments, communication between the source device 110 and the destination device 120 can be performed via wireless communication and/or wired communication. In some embodiments, a connection between the source device 110 and the destination device 120 can be established using one or more transceivers (e.g., a wireless transceiver, a wired transceiver) included in the source device 110 and/or the destination device 120. An example of an exchange of attributes to discover mutual interests via a host device is described in connection with FIG. 3.

Figure 3:
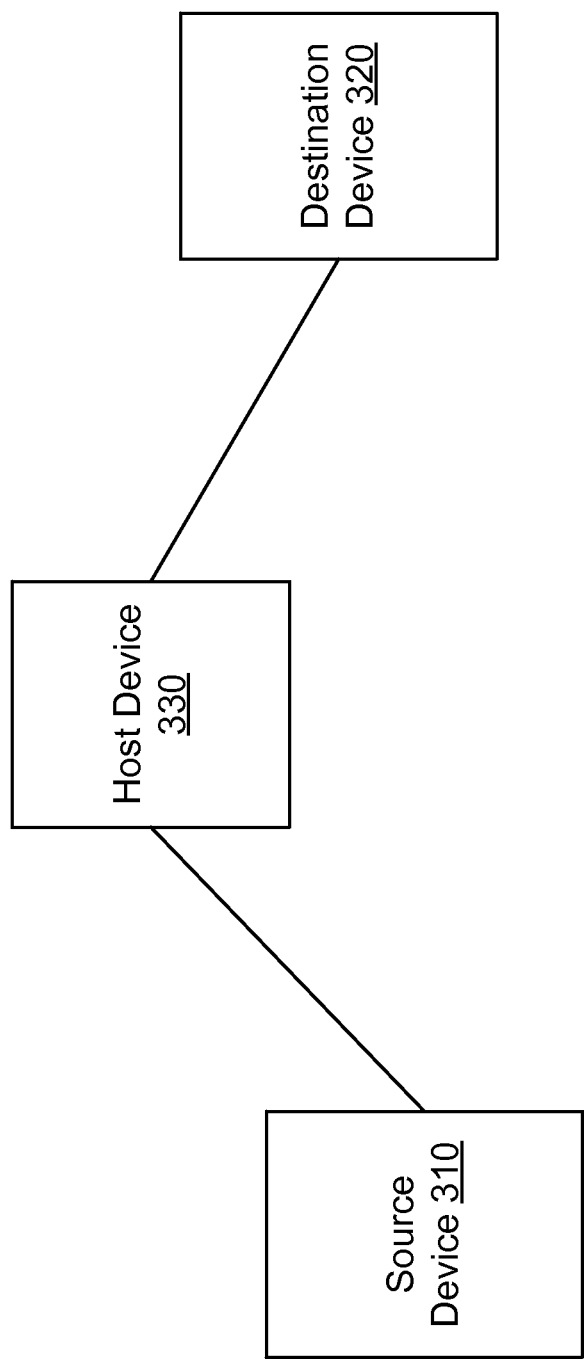
FIG. 3 is a diagram that illustrates an exchange of attributes to discover mutual interests via a host device.

FIG. 3 is a diagram that illustrates an exchange of attributes to discover mutual interests via a host device 330. In this embodiment, the source device 310 is configured to send via the host device 330, or trigger sending from the host device 330 can attribute requests. Similarly, the destination device is configured to send via the host device 330, or trigger sending from the host device 330 and attribute response.

In some embodiments, the host device 330 can be configured to store attributes associated with one or more user accounts for a user of the source device 310 and/or for a user of the destination device 320. Accordingly, the host device 330 can include the functionality of the device 206 shown in FIG. 2A. Specifically, the host device 330 can include, or can have access to, a memory where the attributes are stored, and the host device 330 can include an attribute module 200. The host device 330 can be configured to define an attribute request, perform comparisons of attributes, define an attribute response, and/or so forth.

In some embodiments, the host device 330 can be configured to perform functions associated with an attribute module on behalf of only one of the source device 310 or the destination device 320. For example, the source device 310 can be configured to define an attribute request, and can be configured to send the attribute request to the destination device 320 via the host device 330. The destination device 320, rather than process the attribute request and define an attribute response at the destination device 320, can be configured to trigger the host device 330 to define the attribute response in response to the attribute request. In such embodiments, the host device 330 can have access to (and/or can store) attributes related to a user of the destination device 320 such that the host device 330 can define the attribute response.

Figure 4:
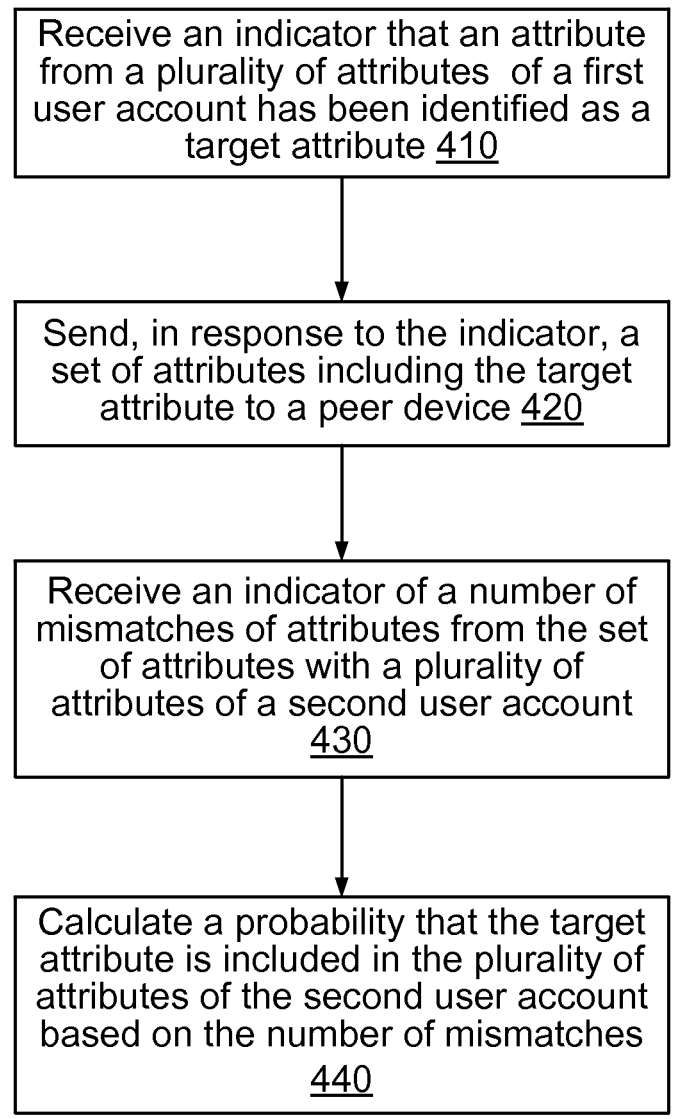
FIG. 4 is a flowchart that illustrates a process for processing a target attribute, according to an embodiment.

FIG. 4 is a flowchart that illustrates a method for processing a target attribute, according to an embodiment. Portions of the method can be performed, at least in part, by, for example, the attribute module 200 shown in FIG. 2A.

An indicator that an attribute from a plurality of attributes of a first user account has been identified as a target attribute is received (block 410). In some embodiments, the indicator can be received at the target attribute processor 210 shown in FIG. 2A. In some embodiments, the attribute from the plurality of attributes can be identified by a user of the first user account as the target attribute. The target attribute can be an attribute targeted for discovery from another user account before engaging in a social interaction with a user of the other user account.

In response to the indicator, a set of attributes including the target attribute is sent to a peer device (block 420). In some embodiments, the set of attributes can be defined and sent from the target attribute processor 210 shown in FIG. 2A. In some embodiments, the set of attributes including the target attribute can be included in an attribute request. In some embodiments, the attribute request can be sent to the peer device in response to the peer device being in relatively close proximity (e.g., less than a threshold proximity) to a device where the first user account is being accessed. In some embodiments, the target attribute can be included within the set of attributes with one or more dummy attributes. In some embodiments, the peer device can be configured to function as a destination device.

An indicator of a number of mismatches of attributes from the set of attributes with a plurality of attributes of a second user account is received (block 430). In some embodiments, the indicator of the number of mismatches of attributes can be received at the response processor 230 shown in FIG. 2A. In some embodiments, the indicator of the number of mismatches can be included in an attribute response defined at a destination device. The destination device can be configured to access the plurality of attributes of the second user account.

A probability that the target attribute is included in the plurality of attributes of the second user account based on the number of mismatches is calculated (block 440). In some embodiments, the probability can be calculated at the response processor 230 shown in FIG. 2A. In other words, the probability that the target attribute matches with at least one of the plurality of attributes of the second user account is calculated. In some embodiments, if the probability exceeds a threshold probability, a user of the first user account can optionally send a request to engage in a social interaction (e.g., a chat, a telephone conversation) with a user of the second user account.

Figure 5:
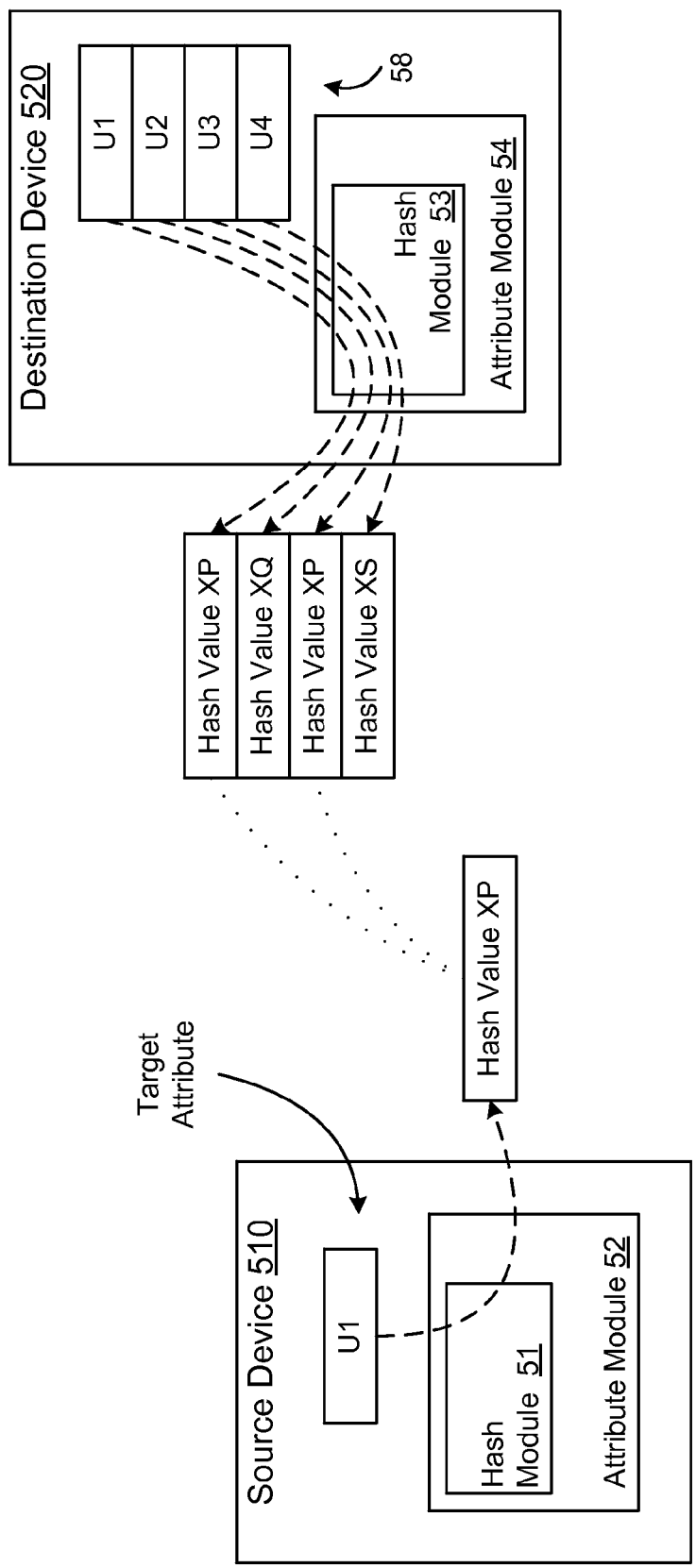
FIG. 5 is a diagram that illustrates a process for attribute discovery, according to an embodiment.

FIG. 5 is a diagram that illustrates a method for attribute discovery, according to an embodiment. FIG. 5 illustrates a source device 510 that includes an attribute module 52 and a destination device 520 that also includes an attribute module 54. The attribute module 52 includes a hash module 51, and the attribute module 54 includes a hash module 53. Although additional modules (e.g., one or more of the modules shown in FIG. 2A) may be included in the attribute modules 52, 54, in this example embodiment, only hash modules 51, 53 are shown.

As shown in FIG. 5, a hash value, hash value XP, is calculated by the hash module 51 based on attribute U1, which is designated as a target attribute. Although not shown in FIG. 5, in some embodiments, the attribute U1 can be selected from a group of source attributes associated with a user account (e.g., a source user account) of a social media application. After the hash value XP of the target attribute U1 has been calculated at the source device 510, the hash value XP can be sent to the destination device 520 in an attribute request.

In this embodiment, the hash value space is relatively small compared with the attribute space. Accordingly, several of the attributes, when hashed by the hash module 51, can result in the same hash value. In other words, the hash value space is defined to be relatively small compared the attribute space so that collisions between hash values will occur. In some embodiments, the hash value space (which can include a specified quantity of hash values or potential hash values) can be defined so that each attribute from the attribute space will be hashed to (e.g., can be mapped to) a common hash value with another attribute from the attribute space (which can include a specified quantity of attributes or potential attributes). By defining a relatively small hash value space compared with the attribute space, an attribute that is designated as a target attribute can be masked even if advertising a hash value calculated based on the attribute. Specifically, several attributes in addition to attribute U1 can result in the hash value XP. Accordingly, advertising the hash value XP does not necessarily indicate that the target attribute is attribute U1, because the hash value XP could also be calculated based on the several attributes.

In response to receiving the attribute request, the hash module 53 of the destination device 520 can be configured to calculate hash values based on destination attributes 58 accessible at the destination device 520. In this embodiment, hash value XP is calculated based on both attribute U1 and attribute U3, hash value XQ is calculated based on attribute U2, and a hash value XS is calculated based on attribute U4. As mentioned above, because the hash value space is relatively small compared the attribute space collisions between hash values can occur. Such is the case with attribute values U1 and U3 which both are related to (e.g., hashed to) the hash value XP.

After the hash values have been calculated based on the destination attributes 58, the destination device 520 can be configured to define an attribute response indicating that at least two hash values calculated at the destination device 520 match with the hash value XP received in the attribute request from the source device 510. Even though the destination device 520 may reveal that the hash value XP calculated by the destination device 520 matches with the hash value XP calculated by the source device 510, neither the destination device 520 nor the source device 510 has precisely revealed any attributes because multiple attributes can be hashed to hash value XP.

Based on the attribute response, the attribute module 52 of the source device 510 can be configured to calculate a probability that the attribute U1 (which is designated as the target attribute) is included in the destination attributes 58. In some embodiments, the probability can be calculated based on a relative size of the hash value space compared with the attribute space. In some embodiments, the probability can be calculated based on a number of attributes (in addition to attribute U1) that can be hashed to the hash value XP. For example, in this embodiment, if the hash value space is defined so that no more than two attribute values can be hashed to a single hash value, the attribute U1 designated as a target attribute at the source device 510 is guaranteed to be included in the destination attributes 58 because at least two of the attributes from the destination attributes 58 are hashed to the hash value XP. As another example, the hash value space can be defined so that no more than two attribute values can be hashed to a single hash value. In such embodiments, if only one of the attributes from the destination attributes 58 is hashed to the hash value XP, the attribute U1 designated as a target attribute at the source device 510 may only have approximately a 50% probability of being included in the destination attributes 58 because only one of the attributes from the destination attributes 58 is hashed to the hash value XP (and potentially another attribute value could be hashed to the hash value XP).

In some embodiments, at least a portion of the attributes (e.g., attribute U1 at the source device 510, the destination attributes 58) that are processed by the source device 510 and/or the destination device 520 can be configured so that they can be hashed using one or more hash algorithms (e.g., hash procedures) implemented by the hash modules 51, 53. For example, the attribute U1 can be associated with, or can be defined as, a value that can be hashed using one or more hash algorithms implemented by the hash modules 51, 53. In some embodiments, the attributes that are processed by the source device 510 and/or the destination device 520 can have a format that can be processed using one or more hash algorithms implemented by the hash modules 51, 53.

In some embodiments, rather than calculating hash values, attributes can be mapped to a set of mapping values. In some embodiments, the set of mapping values can be stored locally, or in a remote location, where they can be accessed by the source device 510 and/or the destination device 520. The value space of the mapping values, like hash values, can include a number of values that is smaller than a number of values included in the attribute space. Accordingly, multiple attributes can be mapped to a single mapping value, and attribute values can be concealed (through mapping to the mapping values) by one device from another device. In some embodiments, other types of mappings and/or hash value techniques can be applied, such as bloom filtering techniques, and so forth.

Figure 6:
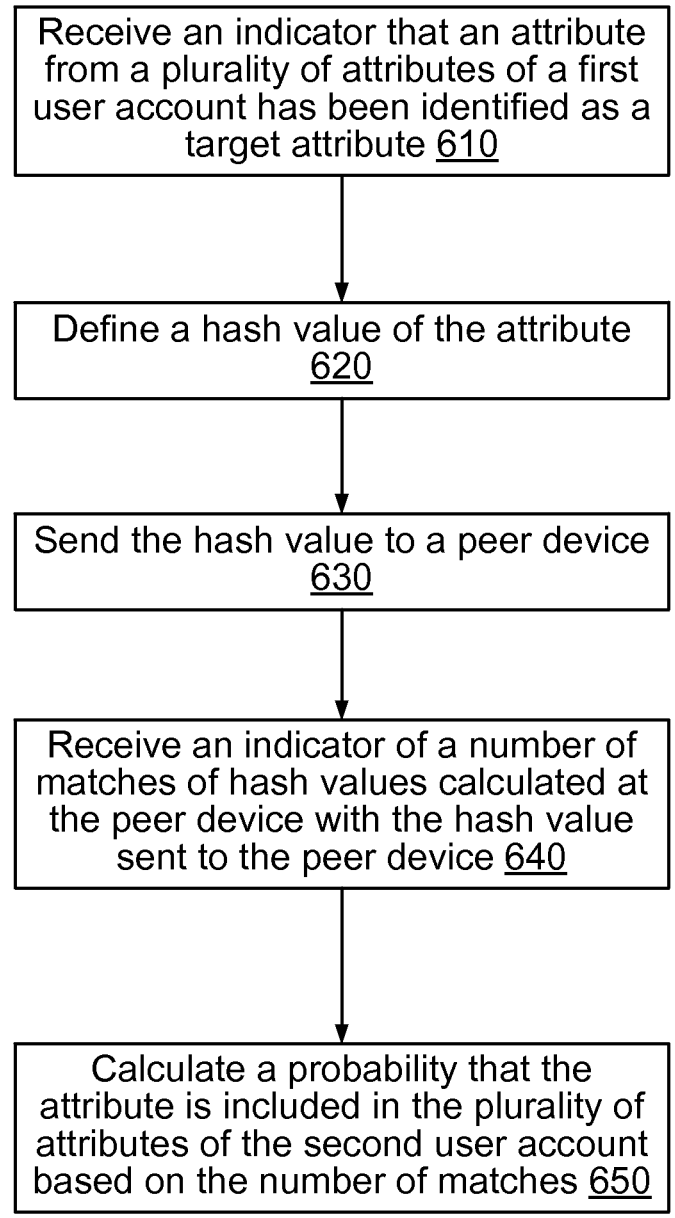
FIG. 6 is a flowchart that illustrates another process for processing a target attribute, according to an embodiment.

FIG. 6 is a flowchart that illustrates another method for processing a target attribute, according to an embodiment. Portions of the method can be performed, at least in part, by, for example, the attribute modules shown in FIG. 5.

An indicator that an attribute from a plurality of attributes of a first user account has been identified as a target attribute is received (block 610). In some embodiments, the attribute can be designated as a target attribute by a user of a user account associated with the target attribute.

A hash value of the attribute is defined (block 620). In some embodiments, the hash value can be referred to as being determined or calculated. The hash value can be defined by, for example, the hash module 51 shown in FIG. 5. In some embodiments, the hash value can be calculated in response to a peer device being detected (e.g., detected within a specified proximity)

The hash value is sent to a peer device (block 630). In some embodiments, the hash value can be sent to the peer device in an attribute request.

An indicator of a number of matches of hash values calculated at the peer device with the hash value sent to the peer device is received (block 640). In some embodiments, the hash values can be calculated at the peer device based on one or more destination attributes accessible at the peer device. In some embodiments, the number of matches can be included in an attribute response defined at the peer device and sent to the source device. In some embodiments, the hash values calculated at the peer device can be calculated using, for example, hash module 53 shown in FIG. 5. In some embodiments, the number of matches can be greater than one.

A probability that the attribute is included in the plurality of attributes of the second user account based on the number of matches is calculated (block 650). In some embodiments, the probability can be calculated based on a size of a hash value space associated with the hash value and/or a size of an attribute space associated with the attribute.

Figure 7:
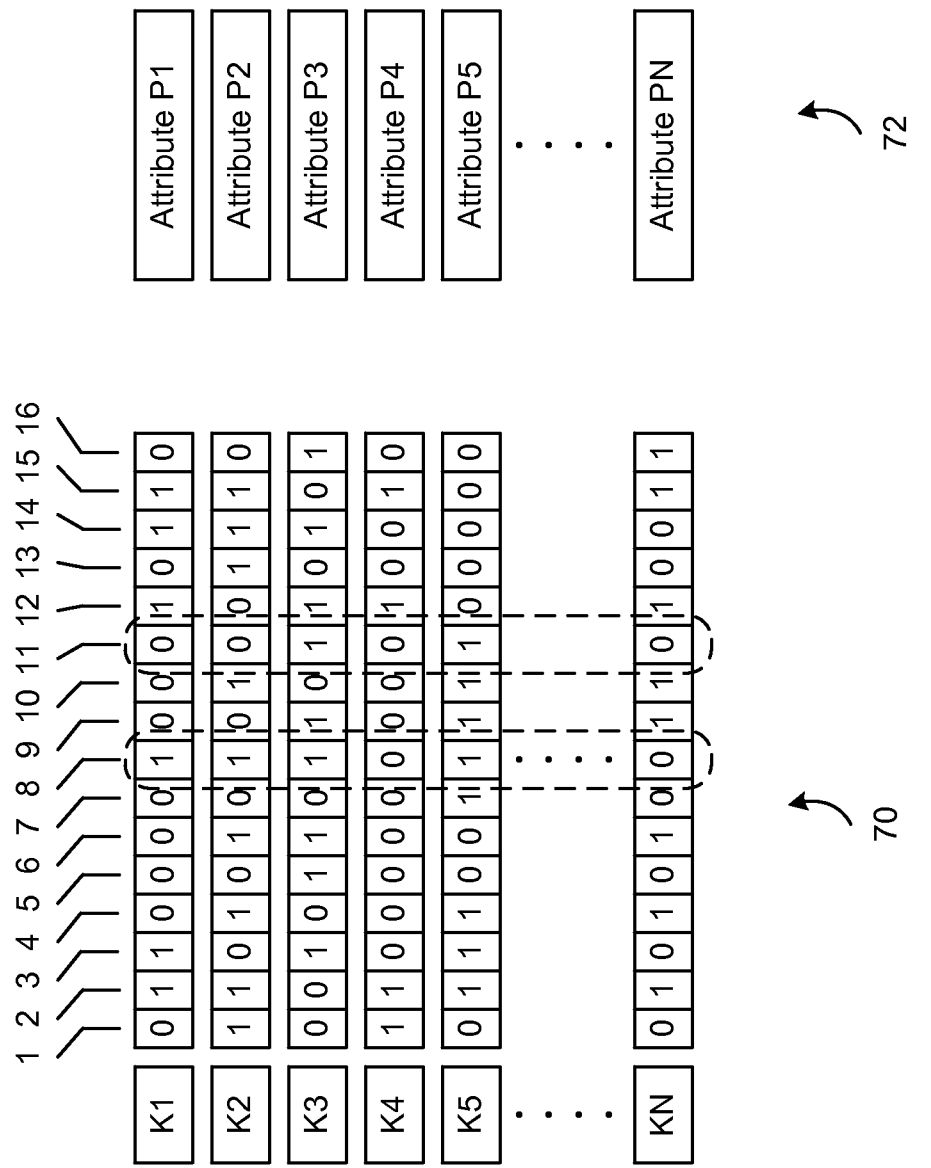
FIG. 7 is a diagram that illustrates attributes associated with one or more codes that can be used for attribute discovery, according to an embodiment.

FIG. 7 is a diagram that illustrates attributes associated with one or more codes that can be used for attribute discovery, according to an embodiment. As shown in FIG. 7, attributes 72, which include P1 through PN, are associated with codes 70 (which can be referred to as code values). In this embodiment, the codes 70 are illustrated as 16 bit binary values. The bit value positions 1 through 16 (which are relative positions within the codes 70) are illustrated above the codes 70, which are labeled K1 through KN. In some embodiments, each of the codes 70 can be a unique for each of the attributes 72, and can be codes 70 that are common to attributes for a set of user accounts. In other words, attributes for each of the user accounts from the set of user accounts can each be associated with at least one of the codes 70. Said differently, a number (or quantity) of values (e.g., code values) included in a code space can be equal to a number (or quantity) of attributes included in an attribute space. In some embodiments, similar to the hash values and/or the mapping values described above, the codes 70 may not be unique to each of the attributes 72. In some embodiments, the codes 70 can be predefined (rather than dynamically produced) and mapped to the attributes 72.

As a specific example of the usage of the codes 70, a source device designating, for example, attribute P4 as a target attribute can be configured to send indicators that the target attribute P4 includes a binary value of "0" at position 8 and a binary value of "0" at position 11 in an attribute request. Even though the code K4 is unique to attribute P4, the entire code (and the attribute P4) will not be shared with a destination device in the attribute request. Based on the binary values and associated positions shared with the destination device in the attribute request, the destination device can determine whether or not one or more codes associated with destination attributes could match with the target attribute. If the destination attributes include attribute P4 and attribute PN, the destination device can define an attribute response that indicates that two attributes are associated with codes (i.e., coded K4 and KN) that include binary values of "0" at positions 8 and 11 (e.g., the same or corresponding relative locations). Although in this embodiment two portions of code K4 are sent in an attribute request, in some embodiments, only a single portion of a code, or more than two portions of a code can be included in an attribute request.

Based on the number of codes 70 that include binary values of "0" at positions 8 and 11, the source device can calculate a probability (e.g., a probability value) that the destination attributes of the destination device include the target attribute. Based on the probability, a user of the source device (and source user account) can optionally engage in additional social interactions with a user of the destination device (and destination user account). In some embodiments, the probability can vary depending on a size of the portion of the code that is included in the attribute request. For example, if a relatively large portion (e.g., a large number a bit values) of the code is included in an attribute request, the probability of positively matching with a destination attribute can be higher than if a relatively small portion of the code is included in the attribute request. The number of collisions possible with relatively large portion may be smaller than the number of collisions possible with the relatively small portion.

Although illustrated as binary values in this embodiment, in some embodiments, one or more codes can include different types of values (e.g., alphanumeric values). Also, in this embodiment, the codes 70 are illustrated as having 16 bits. In some embodiments, one or more codes can have a bit wise length that is greater than 16 bits. In some embodiments, a set of codes can include codes having different lengths.

In some embodiments, a portion of a code associated with an attribute (and relative location of the portion of the code within the code) that is included in an attribute request can be selected based on an algorithm. In some embodiments, the portion of the code can be selected based on a random value generated using, for example, a random number generator (not shown). In some embodiments, the portion of the code that is selected and included in an attribute request can be defined by, for example, a user (e.g., a preference of a user). In some embodiments, the portion (e.g., a size, the relative locations of the portions) of the code can be selected based on a projected probability that the portion of the code may be included in at least one code associated with a destination attribute. The projected probability can be calculated based on, for example, a size of the code space, a size of a portion of a code that is selected for matching, a number of target attributes, a sequence of the bit values, and/or so forth.

For example, a portion of a code that is large (relative to a bitwise length of code) can be selected so that if a match with a destination attribute is found, the confidence (or probability) that the destination attribute is the same as a target attribute can be relatively high. The size of the portion of the code can be selected so that the confidence will exceed a specified confidence.

Figure 8:
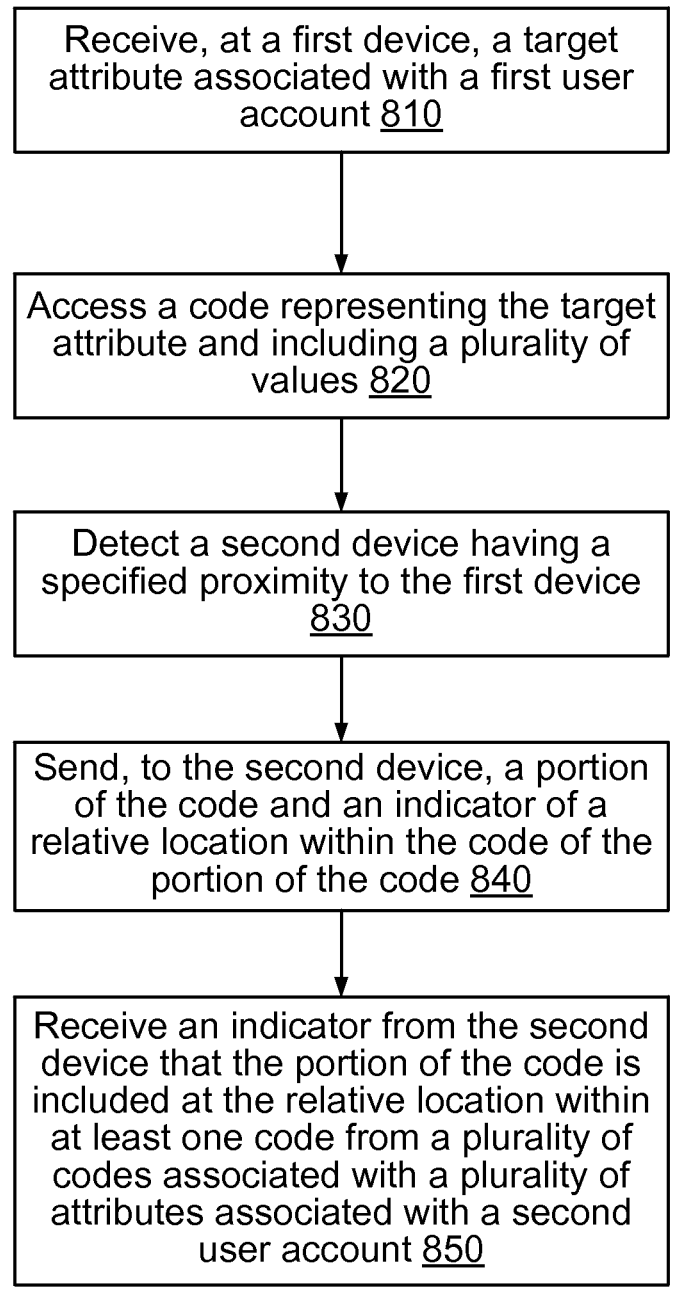
FIG. 8 is a flowchart that illustrates yet another process for processing a target attribute, according to an embodiment.

FIG. 8 is a flowchart that illustrates yet another method for processing a target attribute, according to an embodiment. Portions of the method can be performed, at least in part, by, for example, the attribute module 200 shown in FIG. 2A.

At a first device, a target attribute associated with a first user account is received (block 810). In some embodiments, the target attribute can be designated as a target attribute by a user of a user account associated with the target attribute.

A code representing the target attribute and including a plurality of values is accessed (block 820). In some embodiments, the code can be from a common set of codes associated with attributes. In other words, the code can be from a set of codes that is common to attributes associated with user accounts. In some embodiments, the common set of codes can be stored at a server where they can be accessed by one or more devices (e.g., source devices, destination devices). In some embodiments, the code can be or can include a set of binary values.

A second device having a specified proximity to the first device is detected (block 830). In some embodiments, the second device can be wirelessly detected by the first device.

A portion of the code and an indicator of a relative location within the code of the portion of the code are sent to the second device (block 840). In some embodiments, the portion of the code can be one or more values (e.g., binary values, alphanumeric values). In some embodiments, more than one location within the code can be identified and sent to the second device in, for example, an attribute request.

An indicator from the second device that the portion of the code is included at the relative location within at least one code from a plurality of codes associated with a plurality of attributes associated with a second user account is received (block 850). In some embodiments, the indicator from the second device can be included in an attribute response.

In some embodiments, the techniques described above can be used any combination. For example, the hash values techniques described in connection with FIGS. 5 and 6 can be used in conjunction with the dummy attribute techniques described in connection with FIGS. 2 through 4. In such embodiments, the matching (or mismatching) can be based on hash values. As another example, the hash values techniques described in connection with FIGS. 5 and 6 can be used in conjunction with the code techniques described in connection with FIGS. 7 and 8. In such embodiments, the hash values can function as codes from which portions can be selected.

Implementations of the various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry (e.g., an FPGA (field programmable gate array) or an ASIC (application-specific integrated circuit)).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory may be supplemented by, or incorporated in special purpose logic circuitry.

To provide for interaction with a user, implementations may be implemented on a computer having a display device (e.g., a cathode ray tube (CRT), a light emitting diode (LED), or liquid crystal display (LCD) display device) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser) through which a user can interact with an implementation, or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
    receiving an indicator that an attribute from a plurality of attributes of a first user account has been identified as a target attribute;
    defining a hash value of the target attribute;
    sending the hash value to a peer device;
    receiving an indicator of a number of mismatches calculated at the peer device based on comparison of the hash value sent to the peer device and at least one second hash value of an attribute from a plurality of attributes of a second user account, the at least one second hash value calculated at the peer device based on the plurality of attributes of the second user account stored on the peer device; and calculating a probability that the target attribute is included in a plurality of attributes of the second user account based on the number of mismatches.

2. The method of claim 1, wherein the hash value is associated with a hash value space that includes a number of hash values that is smaller than a number of attributes included in an attribute space associated with the plurality of attributes.

3. The method of claim 1, further comprising:
sending to the peer device a request to engage in a social interaction after the calculating of the probability.

4. The method of claim 1, wherein the hash value is sent to the peer device from a source device, the defining of the hash value is triggered in response to a distance between the peer device and the source device.

5. The method of claim 1, further comprising:
sending, in response to the indicator, a set of hash values of a set of attributes including the hash value of the attribute to the peer device, the indicator of the number of mismatches is based on the set of hash values.

6. The method of claim 1, wherein the indicator of the number of mismatches is calculated based on a comparison of less than all of the hash value with corresponding portions included in a plurality of hash values.

7. The method of claim 1, further comprising:
sending a hash value of a dummy attribute to the peer device.

8. The method of claim 1, wherein the number of mismatches is based on a plurality of hash values of a plurality of dummy attributes excluding the target attribute.

9. The method of claim 1, further comprising:
randomly selecting a dummy attribute from a set of attributes of the first user account; and
sending a hash value of the dummy attribute to the peer device.

10. A system, comprising:
a processor coupled to a memory;
a target attribute processor configured to receive an indicator that an attribute from a plurality of attributes of a first user account has been identified as a target attribute;
a hash module configured to define a hash value of the target attribute, the target attribute processor configured to send the hash value to a peer device; and
a response processor configured to receive an indicator of a number of mismatches calculated at the peer device based on the hash value sent to the peer device and at least one second hash value of an attribute from a plurality of attributes of a second user account, the at least one second hash value calculated at the peer device based on the plurality of attributes of the second user account stored on the peer device, and configured to calculate a probability that the target attribute is included a plurality of attributes of a second user account based on the number of mismatches.

11. The system of claim 10, wherein the hash value is associated with a hash value space that includes a number of hash values that is smaller than a number of attributes included in an attribute space associated with the plurality of attributes.

12. The system of claim 10, further comprising:
sending to the peer device a request to engage in a social interaction after the calculating of the probability.

13. The system of claim 10, wherein the hash value is sent to the peer device from a source device, the defining of the hash value is triggered in response to a distance between the peer device and the source device.

14. A non-transitory computer-readable storage medium storing instructions that when executed cause a processor to perform a process, the process comprising:
receiving, at a first device, a an indicator that an attribute from a plurality of attributes of a first user account as been identified as a target attribute;
determining a hash value representing the target attribute;
sending, to a second device, the hash value representing the target attribute; and
receiving an indicator from the second device of a number of mismatches calculated at the second device based on comparison of the hash value sent to the second device and at least one second hash value of an attribute from a plurality of attributes of a second user account, the at least one second hash value calculated at the second device based on the plurality of attributes of the second user account stored on the second device.

15. The non-transitory computer-readable storage medium of claim 14, the process further comprising:
detecting that the second device is within a threshold proximity to the first device, the instructions to send are triggered in response to the second device being within a threshold proximity to the first device.

16. The non-transitory computer-readable storage medium of claim 14, the process further comprising:
calculating a probability that the target attribute is included in a plurality of attributes of the second user account based on the number of mismatches.

17. The non-transitory computer-readable storage medium of claim 14, wherein the first user account and the second user account are associated with a social media application.

\* \* \* \* \*